United States Patent
Dim et al.

(10) Patent No.: US 9,304,746 B2
(45) Date of Patent: Apr. 5, 2016

(54) CREATING A USER MODEL USING COMPONENT BASED APPROACH

(71) Applicant: Carmel—Haifa University Economic Corporation Ltd., Haifa (IL)

(72) Inventors: Eyal Dim, Reut (IL); Tsvi Kuflik, Reut (IL)

(73) Assignee: Carmel-Haifa University Economic Corporation Ltd., Haifa (IL)

( * ) Notice: Subject to any disclaimer, the term of this patent is extended or adjusted under 35 U.S.C. 154(b) by 173 days.

(21) Appl. No.: 13/911,216

(22) Filed: Jun. 6, 2013

(65) Prior Publication Data
US 2013/0332897 A1   Dec. 12, 2013

Related U.S. Application Data

(60) Provisional application No. 61/656,548, filed on Jun. 7, 2012.

(51) Int. Cl.
*G06F 9/44* (2006.01)

(52) U.S. Cl.
CPC ... *G06F 8/35* (2013.01); *G06F 8/36* (2013.01)

(58) Field of Classification Search
CPC .............. G06F 8/20; G06F 8/33; G06F 8/34; G06F 8/35
USPC .................................................. 717/104, 105
See application file for complete search history.

(56) References Cited

U.S. PATENT DOCUMENTS

| | | | |
|---|---|---|---|
| 7,225,200 B2 * | 5/2007 | Chickering et al. | |
| 7,317,959 B2 * | 1/2008 | Pfander | G06F 9/541 700/83 |
| 7,613,599 B2 * | 11/2009 | Bade | G06F 17/5022 703/14 |
| 7,784,025 B2 * | 8/2010 | Challapalli | G06Q 10/10 717/104 |
| 7,856,658 B2 | 12/2010 | James | |
| 7,904,876 B1 * | 3/2011 | Critz | G05B 19/409 700/17 |
| 7,913,222 B2 * | 3/2011 | Ogilvie | G06F 17/5045 703/13 |
| 7,966,160 B2 * | 6/2011 | Bellifemine | H04L 29/06 703/2 |
| 8,001,519 B2 * | 8/2011 | Conallen | G06F 8/316 717/105 |

(Continued)

OTHER PUBLICATIONS

Baldauf et al. "A Survey on Context-Aware Systems", International Journal of Ad Hoc and Ubiquitous Computing, 2(4): 263-277, 2007.

(Continued)

*Primary Examiner* — Wei Zhen
*Assistant Examiner* — Andrew M Lyons

(57) ABSTRACT

A computerized method of creating a user model, comprising:
1) Providing one or more software component collections containing software components. Each of the software components is associated with a single attribute and has:
   a. An attribute generation engine for calculating an attribute data.
   b. An attribute repository which stores the attribute data.
   c. An output object which outputs the attribute data to another of the plurality of software components.
   d. A metadata field which holds an identifier relating to the respective software component.
2) Selecting by a developer, a subset of software components.
3) Defining by the developer, a plurality of data links mapping data flow among the members of the subset.
4) Generating a user model based on the subset and the data links.
5) Outputting the user model.

20 Claims, 9 Drawing Sheets

(56) References Cited

U.S. PATENT DOCUMENTS

| | | | | |
|---|---|---|---|---|
| 8,146,052 | B2* | 3/2012 | Bray | G06F 17/505 709/250 |
| 8,239,824 | B2* | 8/2012 | Cifra | G06F 8/34 717/109 |
| 8,291,372 | B2* | 10/2012 | Dangeville | G06F 8/10 717/103 |
| 8,312,416 | B2* | 11/2012 | Freund | G06F 8/10 717/102 |
| 2004/0107414 | A1* | 6/2004 | Bronicki | G06F 8/34 717/105 |
| 2005/0080640 | A1* | 4/2005 | Bhaskaran | G06Q 10/06 705/7.37 |
| 2005/0160401 | A1* | 7/2005 | Russo | G06Q 10/06 717/108 |
| 2006/0168577 | A1* | 7/2006 | Melo et al. | 717/168 |
| 2006/0242195 | A1* | 10/2006 | Bove | G06F 8/35 |
| 2007/0150861 | A1* | 6/2007 | Bray | G06F 8/34 717/109 |
| 2008/0189679 | A1* | 8/2008 | Rodriguez | G06F 8/34 717/105 |
| 2008/0270973 | A1* | 10/2008 | Edwards | G06Q 10/04 717/104 |
| 2008/0270977 | A1* | 10/2008 | Nucci | G06F 8/10 717/105 |
| 2008/0288917 | A1* | 11/2008 | Lee | G06F 8/24 717/105 |
| 2009/0157872 | A1* | 6/2009 | Pinkston | G06F 9/546 709/224 |
| 2009/0241088 | A1* | 9/2009 | Dangeville | G06F 8/10 717/105 |
| 2010/0077377 | A1* | 3/2010 | Pegden | G06F 8/34 717/105 |
| 2010/0153909 | A1* | 6/2010 | Batey | G06F 8/36 717/104 |
| 2011/0231434 | A1 | 9/2011 | Tabata et al. | |
| 2011/0265060 | A1* | 10/2011 | Fritzsche | G06F 8/10 717/104 |
| 2012/0072367 | A1* | 3/2012 | Reisbich | G06F 8/20 705/348 |
| 2012/0240098 | A1* | 9/2012 | Souza | G06F 8/20 717/104 |
| 2012/0240099 | A1* | 9/2012 | Dangeville | G06F 17/30864 717/105 |
| 2012/0297390 | A1* | 11/2012 | Heath, III | G06F 9/5038 718/102 |
| 2013/0205275 | A1* | 8/2013 | Thomson | G06F 8/34 717/105 |
| 2013/0227518 | A1* | 8/2013 | Kirby, Jr. | G06F 8/10 717/104 |
| 2014/0310683 | A1* | 10/2014 | McCarty | G06F 8/20 717/105 |

OTHER PUBLICATIONS

Berkovsky et al. "Mediation of User Models for Enhanced Personalization in Recommender Systems", User Modeling and User-Adaption Interaction, 18(3): 245-286, Aug. 10, 2008.

Brusilovsky et al. "User Modeling in a Distributed E-Learning Architecture", Proceedings of the 10th International User Modeling Conference, Edinburgh, UK, Jul. 24-29, 2005, 3538: 387-391, Jul. 2005.

Carmagnola et al. "User Model Interoperability: A Survey", User Modeling and User-Adaption Interaction, 21: 285-331, Published Online Feb. 18, 2011.

Christopoulou et al. "GAS Ontology: An Ontology for Collaboration Among Ubiquitous Computing Devices", International Journal of Human Computer Studies, 62(5): 664-685, 2005.

Dey et al. "Towards a Better Understanding of Context and Context-Awareness", CHI'2000, Workshop on the What, Who, Where, When, and How of Context-Awareness, 12 P., 2000.

Estublier et al. "Component Models and Technology", Building Reliable Component-Based Software Systems, Chap.4: 57-86, 2002.

Heckmann "Ubiquitous User Modeling", Dissertation for Requirement of the Degree of Doctor of Engineering Sciences, Naturwissenschaftlich-Technische Fakultaeten der Universitaet des Saarlandes, Saarbruecken, Germany, Akademische Verlagsgesellschaft AKA, 290 P., Dec. 7, 2005.

Hofer et al. "Context-Awareness on Mobile Devices—The Hydrogen Approach", Proceedings of the 36th Annual Hawaii International Conference on System Sciences, HICSS'03, Hawaii, USA, Jan. 6-9, 2003, p. 292-302, Jan. 2003.

Kay et al. "Creating Personalised Systems That People Can Scrutinise and Control: Divers, Principles and Experience", ACM Transactions on Interactive Intelligent Systems, 2(4/Art.24): 1-43, Dec. 2012.

Kay et al. "Scrutability, User Control and Privacy for Distributed Personalization", Proceedings of the CHI2006 Workshop on Privacy-Enhanced Personalization, PEP2006, Montreal, Quebec, Canada, Apr. 22, 2006, p. 21-22, Apr. 2006.

Kobsa "Generic User Modeling Systems", The Adaptive Web: Methods and Strategies in Web Personalization, Lectures Notes in Computer Science, LNCS 4321(Chap.4): 135-154, 2007.

Kobsa et al. "An LDAP-Based User Modeling Server and Its Evaluation", User Modeling and User-Adapted Interaction: The Journal of Personalization Research, 16(2): 129-169, May 2006.

McIlroy "Mass Produced Software Components", Software Engineering, Rpoert on a Conference Sponsored by the NATO Science Committee, Garmisch, Germany, Oct. 7-11, 1968, NATO Scientific Affairs Division, p. 138-155, 1969.

Niu et al. "PERSONAF: Framework for Personalised Ontological Reasoning in Pervasive Computing", User Modeling and User Adapted Interaction: The Journal of Personalization Research, 20(1): 1-40, 2010.

Santana de Almeida et al. "A Survey on Software Reuse Processes", 2005 IEEE International Conference on Information Reuse and Integration, IRI 2005, Aug. 15-17, 2005, p. 66-71, 2005.

Vassileva et al. "Multi-Agent Multi-User Modelling in I-Help", User Modeling and User-Adapted Interaction, 13(1-2): 179-210, 2003.

Yimam-Seid et al. "Expert-Finding Systems for Organizations: Problem and Domain Analysis and the DEMOIR Approach", Sharing Expertise: Beyond Knowledge Management, Chap.13: 327-359, 2003.

Yudelson et al. "A User Modeling Server for Contemporary Adaptive Hypermedia: An Evaluation of the Push Approach to Evidence Propagation", User Modeling, 4511: 27-36, 2007.

* cited by examiner

CREATING A USER MODEL USING COMPONENT BASED APPROACH

RELATED APPLICATION

This application claims the benefit of priority under 35 USC 119(e) of U.S. Provisional Patent Application No. 61/656,548 filed Jun. 7, 2012, the contents of which are incorporated herein by reference in their entirety.

BACKGROUND

The present invention, in some embodiments thereof, relates to user modeling, and, more specifically, but not exclusively, to user modeling employing component based approach.

As systems' complexity increases the need for modeling tools, services and/or frameworks becomes more evident. Current systems, tools and/or tools for creating user models (representing one or more users) usually are based on proprietary concepts, allowing a developer of the user model to develop user models (UM) in an ad-hoc manner for the following main reasons:
(i) System developers focus on specific characteristics of their users in order to deliver a specific service.
(ii) The user modeling community does not have commonly accepted standards and/or frameworks for user model development and/or user model structure.
(iii) User model components, i.e. user model building blocks are not publicly shared for reuse.
(iv) Developing a standard user model that holds a comprehensive set of attributes requires a major effort to be carried out in by a single organization, facility and/or vendor.

As the user modeling research advanced it suggested moving away from complete monolithic solutions and/or user modeling ontological representations towards partial and/or dynamic solutions providing modular architectures supported by mediation techniques to support some level of interoperability.

One modular approach is component based development which supports development of complex user models by dividing them into independent components. Component-based development approach focuses on sharing and reusing components which potentially improve efficiency of system design and development. A component may be represented as an abstract box that encapsulates its properties and/or processing. The component may hold information, be sensitive to events and context, and supply services, which are constrained by conditions.

SUMMARY

According to some embodiments of the present invention, there are provided methods of creating a user model. A plurality of software components is provided from one or more software components collections. Each one of the plurality of software components is associated with a single attribute and has:
  Attribute generation engine for creating a single attribute value.
  Attribute repository field which stores the single attribute value.
  Output object which outputs the single attribute value to other software components of the plurality of software components.
  Metadata which holds an identifier relating to the respective software component.

The user model developer selects a subset of software components form the plurality of software components and defines a plurality of data links mapping flow among a plurality of members of the subset. The user model is created based on the subset and the plurality of data links. The user model includes an execution mechanism for instantiating the user model for one or more specific users. The user model is then outputted.

Optionally, the user model is instantiated, using the execution mechanism, for one or more users.

Optionally, group model, which combines two or more of the user models, is created.

Optionally, the group model is instantiated, using the execution mechanism, for the two or more user models which are instantiated for one or more users.

Optionally, the plurality of data links define the flow of the attribute data of the plurality of software components among the plurality of software components within the user model.

Optionally, the plurality of data links define the flow of the attribute data of the plurality of software components between the plurality of software components and one or more service applications external to the user model. The one or more service applications retrieve information from the user model following instantiation of the user model.

Optionally, the plurality of data links includes information relating to the implementation of the plurality of software components within the user model.

Optionally, compositions combining two or more of the plurality of software components are used to create the user model.

According to some embodiments of the present invention, there are provided methods of creating and storing in a non-transitory medium a plurality of software components. Each of the software components is associated with a single attribute and includes:
  An input object which is set to receive input data from one or more other software components of the plurality of software components.
  An attribute generation engine for calculating attribute data based on the input data.
  An attribute repository field which stores the attribute data.
  An output object which outputs the attribute data in response to access by other one or more of the plurality of software components.
  A metadata field which holds an identifier relating to the respective software component.

Optionally, the software component includes an attribute access object for managing the access made by the other one or more software components.

Optionally, the attribute generation engine generates a default value for the attribute data when the input data is not available.

Optionally, the attribute repository field stores a plurality of attribute values of the attribute data, each one of the plurality of attribute values is associated with a time tag.

Optionally, the metadata field holds additional information relating to the software component. The additional information may include one or more members of a group consisting of: software component type, user model identification data, group model identification data, instance identifier, interfaces description, configuration control, attribute definition and software component behavior explanations.

Optionally, the input object supports receiving input data from a plurality of different software components.

According to some embodiments of the present invention, there are provided systems for creating a user model. the system includes a processor, a user interface module which interacts with a developer to create a user model, a software component creation module which creates one or more of a plurality of software components interactively with the developer through the user interface, a modeling module which creates the user model using the plurality of software components interactively with the developer through the user interface (the plurality of components conform to the template) and an output module which outputs the user model in one or more of a plurality of representations. Each of the software components is created using a template to which all software components conform. The user model includes an execution mechanism for instantiating the user model for one or more users.

Optionally, the system includes an execution module which instantiates the user model for one or more specific user. The instantiation is done using the execution mechanism.

Optionally, the execution module instantiates a group model with two or more group member user models. Each of the two or more group member user models is instantiated for one or more users.

Optionally, the software component creation module creates the one or more software components using a template.

Optionally, the modeling module retrieves one or more of the plurality of software components from a component collection.

Optionally, the one or more of the plurality of representations includes visual representation displayed to said developer.

Optionally, the one or more of the plurality of representations includes a digital format for storing the user model in a storage medium or using the user model in one or more another system or software tool.

Optionally, the modeling module is capable of creating a group model which combines two or more user models.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
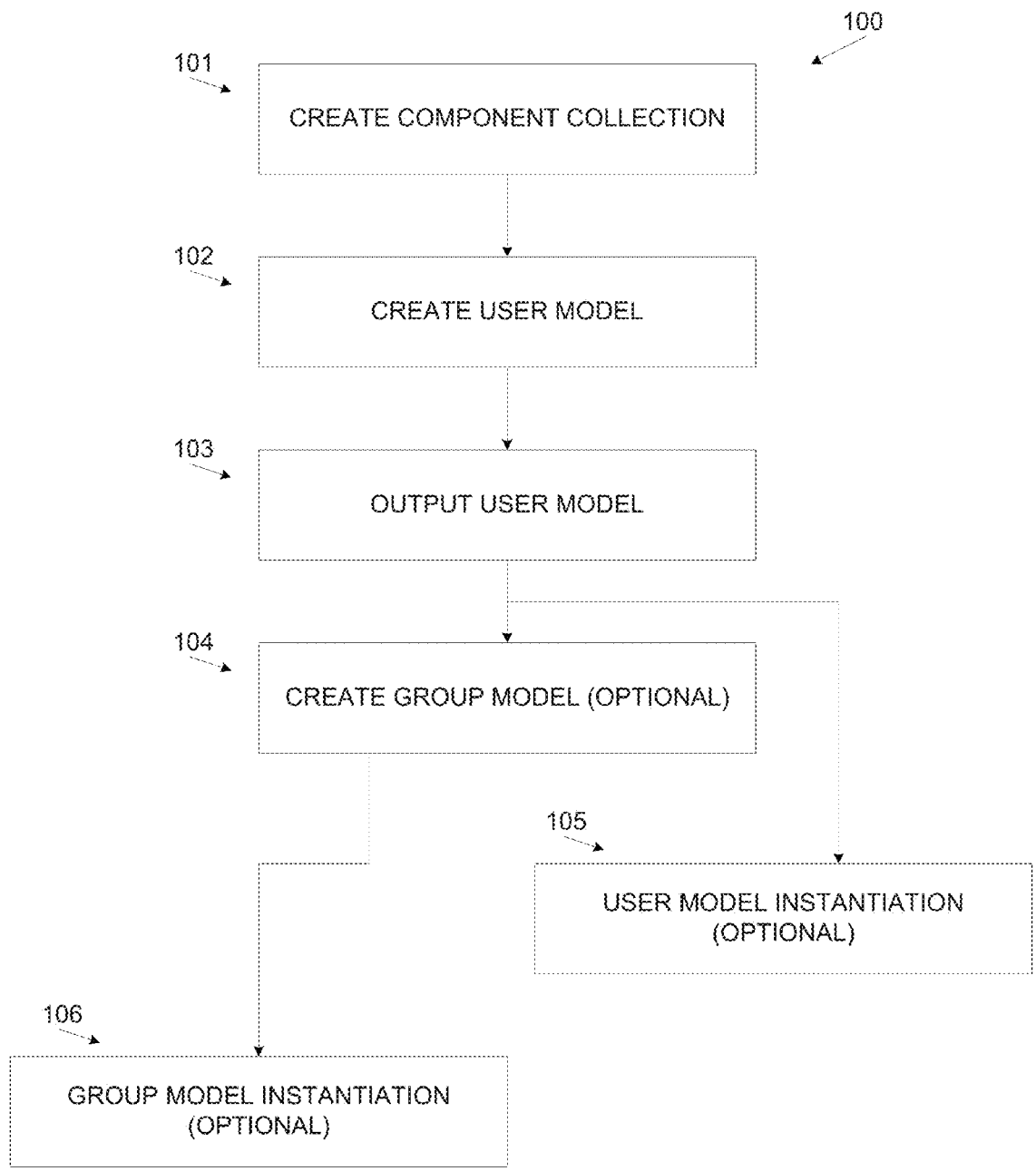
FIG. 1 is a flowchart of an exemplary process of creating a user model using component based approach, according to some embodiments of the present invention.

The present invention, in some embodiments thereof, relates to user modeling, and, more specifically, but not exclusively, to user modeling employing component based approach.

According to some embodiments of the present invention there are provided systems and methods for developing a user model employing component based approach by dividing the user model into small, standard and reusable multipurpose building block software components having a common structure that may be integrated to create an abstract user model. The component based approach is an incremental approach for user modeling which is based on defining the building block software components as reusable units for deployment and composition of the user model.

A user model includes a plurality of concepts in which the concepts are composed of one or more of the plurality of software components. The user model is developed by selecting the software components that implement the characteristics and/or features required by the user model. The software components may be retrieved from one or more component collections.

Optionally, group models are modeled using the component based approach to support modeling of a group comprising of two or more user models. The group model may include and/or present characteristics and/or attributes induced from the relationships and/or impacts between two or more of the user model the group model includes.

According to some embodiments of the present invention there are provided systems and methods for creating a plurality of software components to be used for constructing the user model. The software components are created using a common structure so as to maintain a standard representation of the software components. Each of the software components is associated with a single attribute. The component is a small bounded unit which is capable of receiving data through one or more input ports, processing the data to generate an attribute data, storing the attribute data after time tagging it and allowing access to the attribute data from other software components through a single output port. The component may include metadata which holds additional information that relates to the component, for example, software component type, user model or group model identification data, model instance identifier, definition of the attribute and/or software component behavior explanations.

Optionally, the component is capable of generating default attribute data without receiving data from the input port(s).

Optionally, the component may store a plurality of specific attribute values each paired with a time tag to provide multiple values of the attribute over time.

The plurality of software components constituting the user model is connected among themselves with data links according to the concept, capability and/or feature they are required to present. The data link represents a communication and/or interface channel among the software components and/or between the software components and service applications that need the software component information content. The data link defines the flow of data through the user model and delivers attribute data from the software component to a consumer (e.g., another software component and/or another application) as a tuple. The tuple may include a plurality of additional data items, for example, the origin component identification, the sending time and/or a collection of time tagged values of the software components' attributes.

Optionally, the user model and/or the group model hold design information relating to the software components and/or the data links implementing and/or organizing the user model and/or group model respectively.

Dividing the user models into simple and/or small software components may enable the recruiting the effort of a plurality of vendors, organizations and/or sites to map and generate these software components. The software components may be aggregated into a publicly available collection(s). The software components, their dynamically expanding collection and relevant methodologies could become a user-modeling standard supporting component suppliers, user model developers to develop user models and service applications designers using the developed user models for creating their service applications.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer and/or computerized device program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the developer's and/or user's computer, partly on the developer's and/or user's computer, as a standalone software package, partly on the developer's and/or user's computer or computerized device (e.g. smart phone, smart object, smart devices, etc.) and partly on a remote computer or entirely on the remote computer or server. In the latter scenario, the remote computer may be connected to the developer's and/or user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1 which is a flowchart of an exemplary process of creating a user model using component based approach, according to some embodiments of the present invention.

As shown at 101, an exemplary process 100 of creating a user model using component based approach employs creation of a plurality of software components. All software components of the plurality maintain a common structure and are each associated with a single attribute of the user model. The plurality of software components may be stored in a shared collection which may be available to a plurality of developers each constructing their own user model.

As shown at 102, a user model is constructed using the plurality of software components to represent one or more concepts of the user model according to the required capabilities, features and/or characteristics of the user model.

As shown at 103, once the user model is created it may be outputted in one or more of a plurality of presentations. Presentations may include, for example, visual presentations to be presented to the developer, for example, through a display, screen, hard copy and/or printout. Presentations may also include digital format in the form, for example of a binary file for the purpose of, for example, storage of the user model in a storage medium and/or for making the user model available to other systems and/or software tools and/or applications which desire to make use of the user model.

The created user model may include an execution mechanism which may be used to instantiate the user model with specific information of one or more users. Instantiation of the user model may be performed at any stage after the user model is created and outputted. The created group model may also include an execution mechanism which is used to instantiate the user model with group member user model that are instantiated for specific users.

Optionally, as shown at 104, a group model is created which includes two or more user models where each of the user models is created using the process 100.

Optionally, as shown at 105, instantiation of the user model may be performed in which values related to one or more specific users are assigned to the various attributes of the software components of the user model to perform, for example, system exploration, information utilization, evaluation, optimization, adaptation and/or improvement.

Optionally, as shown at 106, instantiation of the group model may be performed in which values related to a group and its members are assigned to the various attributes of the software components of the group model to perform, for example, system exploration, information utilization, evaluation, optimization, adaptation and/or improvement.

Figure 2:
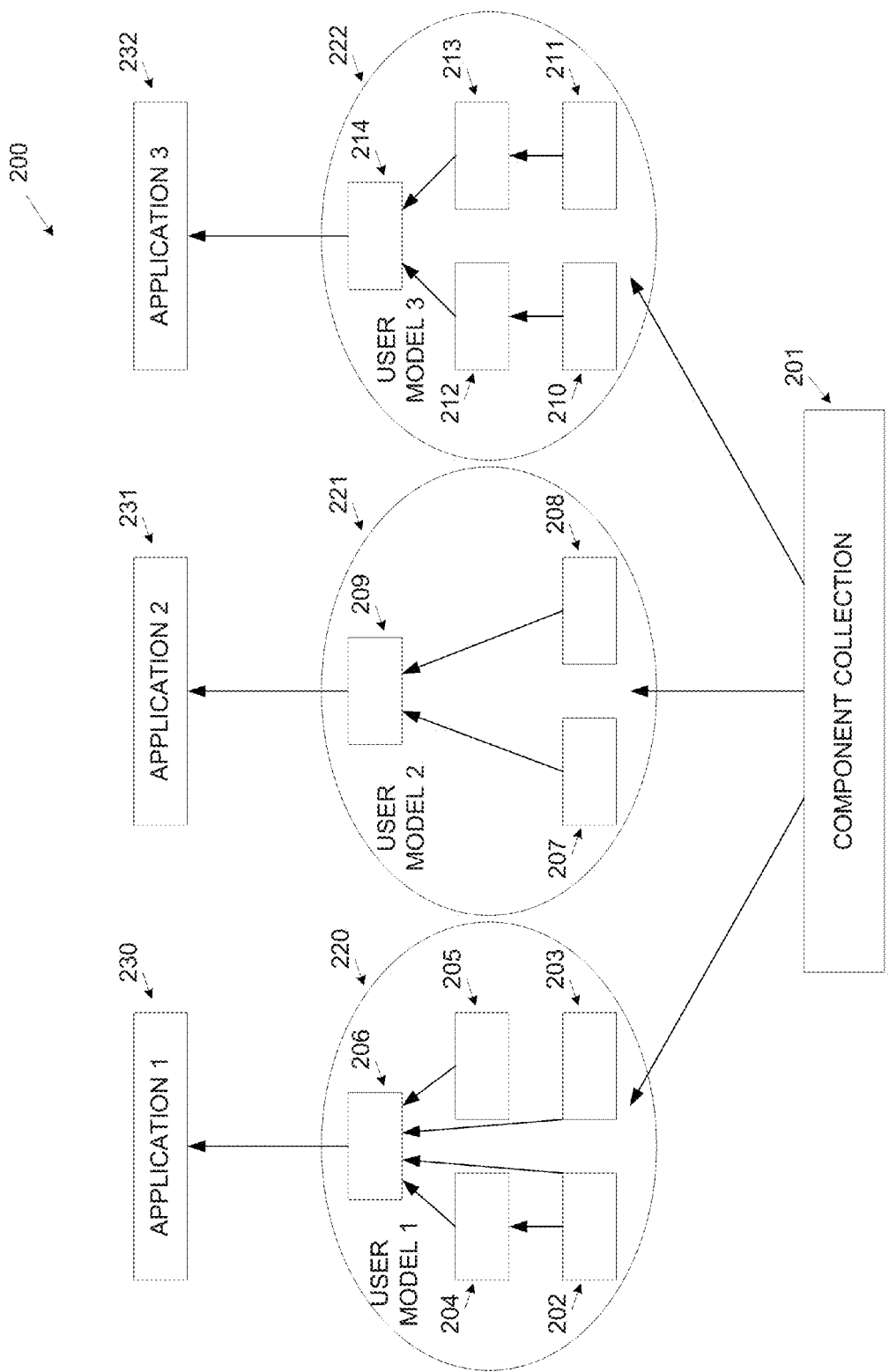
FIG. 2 is a schematic illustration of an exemplary design space for constructing user models by employing component based approach, according to some embodiments of the present invention.

Reference is now made to FIG. 2 which is a schematic illustration of an exemplary design space for constructing user models by employing component based approach, according to some embodiments of the present invention. An exemplary design space 200 may be used for constructing a plurality of user models 220, 221 and 222 each serving one of a plurality of applications 230, 231 and 232 respectively. Each of the user models 220, 221 and 222 may be constructed using a subset of the software components available in a component collection 201. The user model 220, for example, is constructed of software components 202, 203, 204, 205 and 206 where each software component provides a single attribute. The software components, 202, 203, 204, 205 and 206 are connected among themselves with data links. The data links define the flow of information through the user models 220, 221 and 222. Each of the software components may receive input attribute data from one or more other software components, as shown for example for the software component 206 which receives attribute data input from four software component, 202, 203, 204 and 205. However, a software component may generate a default attribute data, for example when data input is not available, as is shown for example, for the software component 205 which has no input data link. Each of the user models 220, 221 and/or 222 may be constructed using a different subset of the software components available in the components collection 201. The user models 220, 221 and/or 222 may use the same software components in different contexts to represent different capabilities, features and/or characteristics as required by the developer.

Some embodiments of the present invention, are presented herein by means of an example, however the use of this example does not limit the scope of the present invention in any way.

Figure 3:
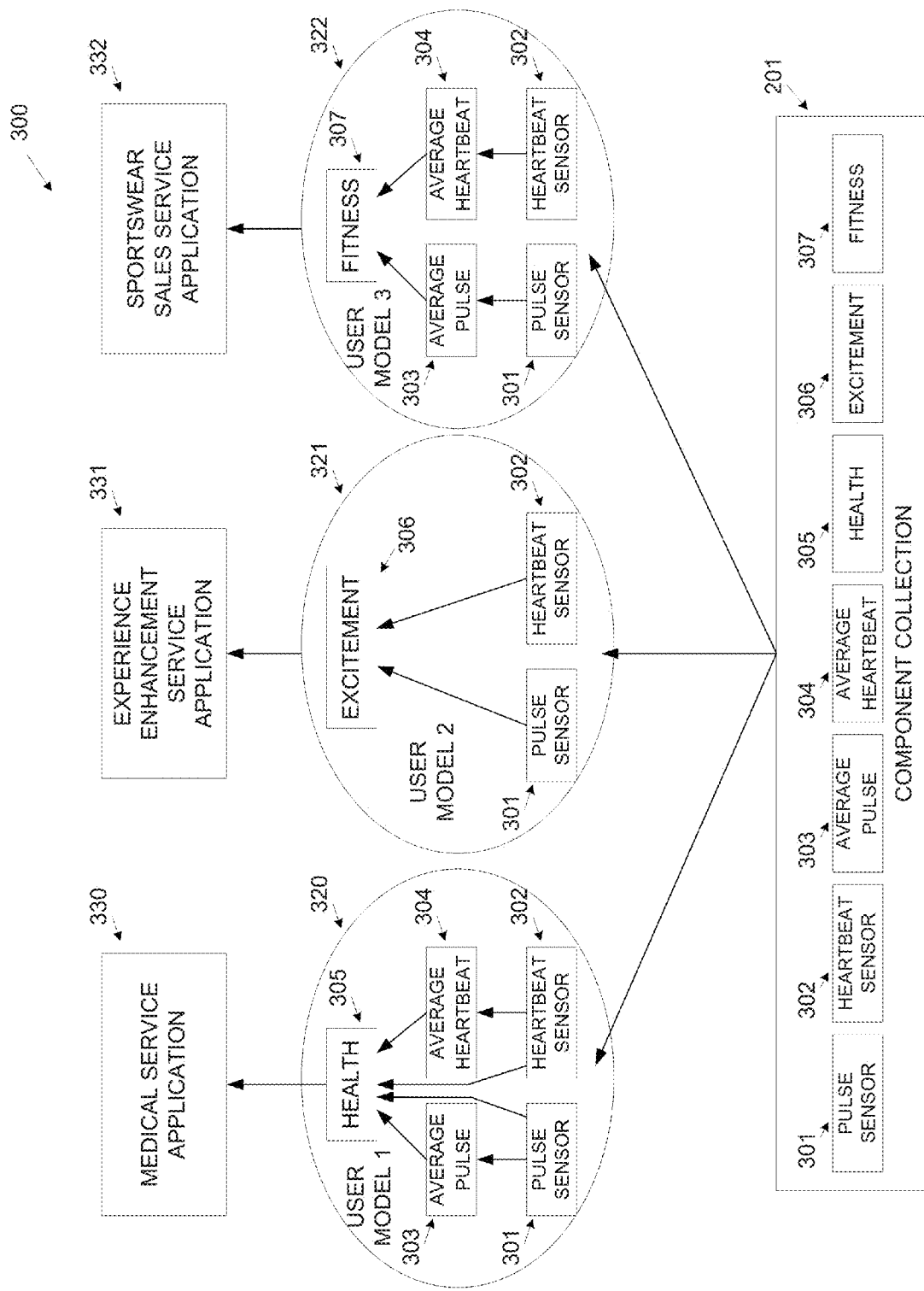
FIG. 3 is a schematic illustration of an exemplary design space for constructing user models employing vital signs sensors, according to some embodiments of the present invention.

Reference is now made to FIG. 3 which is a schematic illustration of an exemplary design space for constructing user models employing vital signs sensors, according to some embodiments of the present invention. An exemplary design space 300 may be used for constructing three user models 320, 321 and 322 each serving one of a plurality of applications, for example, a medical service application 330, an experience enhancement service application 331 and a sportswear sales service application 332 respectively. The three user models 320, 321 and 322 share software components, for example, pulse sensor 301, heartbeat sensor 302, average pulse 303 and/or average heartbeat 304 which are available from a component collection such as the component collection 201. The user models 320, 321 and 322 also use additional software components, for example, health 305, excitement 306 and/or fitness 307 which are employed to support the context and/or concept of the user model.

As can be seen in the exemplary design space 300, the context of the medical service application 330 requires the user model 320 to provide health indication. Therefore the user model 320 implements software component composition to support that context and provide current vital signs readings as well as average readings. The software component health 305 receives attribute data from all the other software components in the user model 320, i.e., the pulse sensor 301, the heartbeat sensor 302, the average pulse 303 and the average heartbeat 304 to process attribute data of the software component health 305 and make attribute data available to the medical service application 330.

The context of experience enhancement service application 331 requires the user model 321 to provide only current vital signs readings. Therefore the user model 321 implements software component composition to support that context and provide current health readings as well as average readings. The software component excitement 306 receives attribute data from the pulse sensor 301 and the heartbeat sensor 302 to process attribute data of the software component excitement 306 and make the attribute data available to the experience enhancement service application 331.

The context of the sportswear sales service application 332 requires the user model 322 to provide averaged pulse and heartbeat indications. Therefore the user model 322 implements software component composition to support that context and provide average vital signs readings. The average pulse 303 and the average heartbeat 304 software components receive attribute data from the pulse sensor 301 and the heartbeat sensor 302 respectively and process it to create their own attribute data. The attribute data of the software components average pulse 303 and the average heartbeat 304 then make their attribute data available to the software component fitness 307 which manipulates it to create its own attribute data which may be used by the sportswear sales service application 332.

According to some embodiments of the present invention there are provided systems and methods for creating the plurality of software components to be used for constructing the user model. Each software component is a small bounded unit and is associated with a single attribute. The software components employ a common structure.

Figure 4:
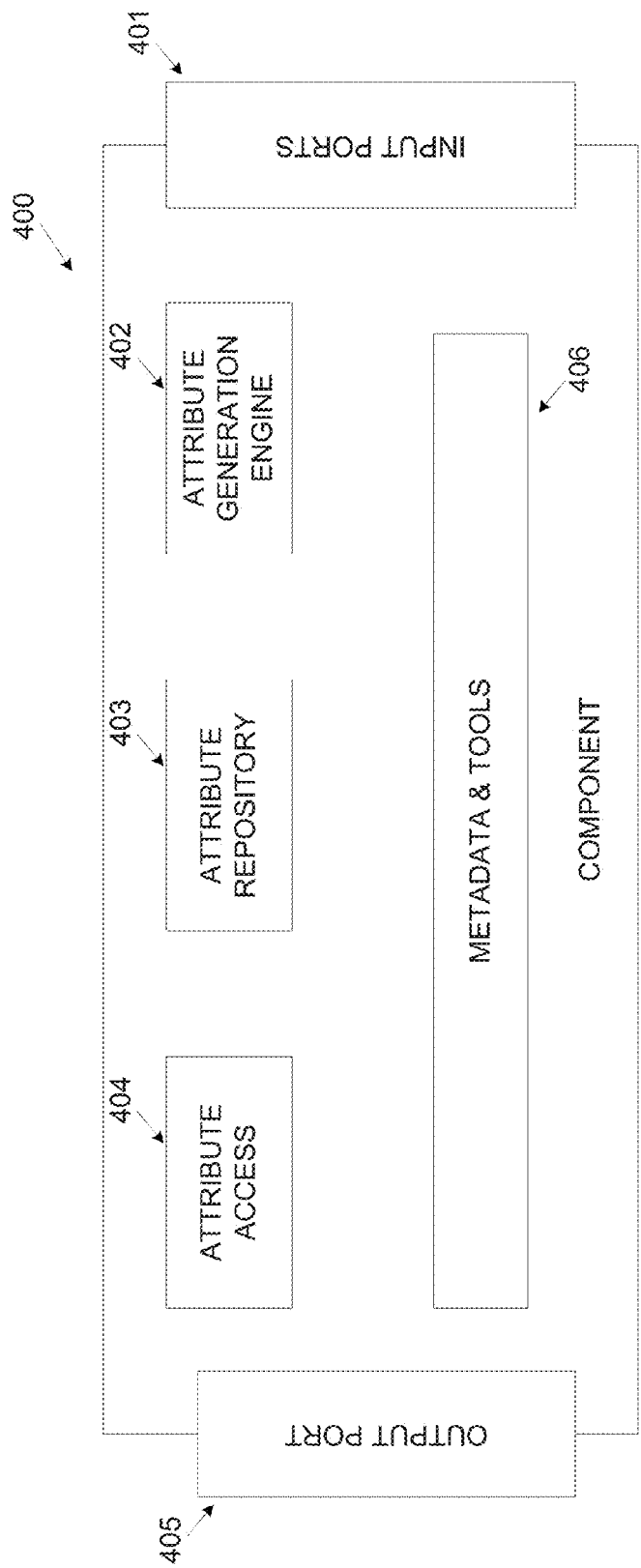
FIG. 4 is a schematic illustration of an exemplary software component, according to some embodiments of the present invention.

Reference is now made to FIG. 4 which is a schematic illustration of an exemplary software component, according to some embodiments of the present invention. An exemplary software component 400 includes the following objects, input ports 401, attribute generation engine 402, attribute repository 403, attribute access 404, output port 405 and metadata & tools 406. Each of the objects, the input ports 401, the attribute generation engine 402, the attribute repository 403 and the attribute access 404 is optional and may not be present in the software component 400. Presence of the objects may depend on, for example, the functionality of the software component 400, the purpose the software component 400 serves and/or the interaction it may require with one or more other software components. The software component 400 may receive, through the input ports 401, input attribute data from one or more other software components, sensors or human-machine interfaces which precede the software component 400 in the user model composition. The attribute generation engine 402 may contain executable software program instructions, firmware or hardware configured to manipulate the received input attribute data to generate attribute data of the software component 400. Manipulation of the received input attribute data may include, for example, processing the received input attribute data, inferring attribute data from the input attribute data and/or leaving the input attribute data as is. The attribute repository 403 is used to store the attribute data of the software component 400. Other software components which succeed the software component 400 in the user model composition may access the attribute data of the software component 400 through the output port 405. The attribute access 404 controls the access to the attribute data so as to verify whether the accessing service and/or software component is authorized to access the attribute data, based on a plurality of considerations, for example, privacy and/or hierarchy. The metadata & tools 406 holds a component identifier used to identify the software component. The metadata & tools 406 may hold additional information that relates to the software component 400, for example, definition of the attribute (such as help functionality) and/or component behavior explanations, interfaces allowing other software components and/or services to use the software component, tools to control the data (e.g. update and/or delete), interfaces for tools that use software components in models' design. The software component's metadata enables a user model developer to search and select the software component 400 that is required for his user model through the metadata description of the software component 400 and to understand the behavior of the software component 400.

Optionally, the attribute generation engine 402 is capable of generating default attribute data without receiving data from the input ports 401, for example in the event no software component is connected to the input ports 401.

Optionally, the software component 400 may hold, through the attribute repository 403, a plurality of attribute data values. Each of the plurality of attribute data values is associated with a time tag to provide multiple values of the attribute over time.

Optionally, the software components 400 are selected from a component collection such as the component collection 201. The component collection may be utilized through, for example, local storage medium, remote storage and/or online database.

The plurality of software components 400 composing the user model are connected among themselves by the data links which define the information flow within the user model. The composition of the software components and their connections serve the concepts, capabilities and/or features that are required by the user model. The data link between the software components 400 may hold composition information relating to the software components' implementation and/or organization within the user model composition. The composition information is delivered from one software component to the next as a tuple. The tuple may include a plurality of data items, for example, the origin component identification, the sending time and/or a collection of time tagged values of the software components' attributes.

Figure 5:
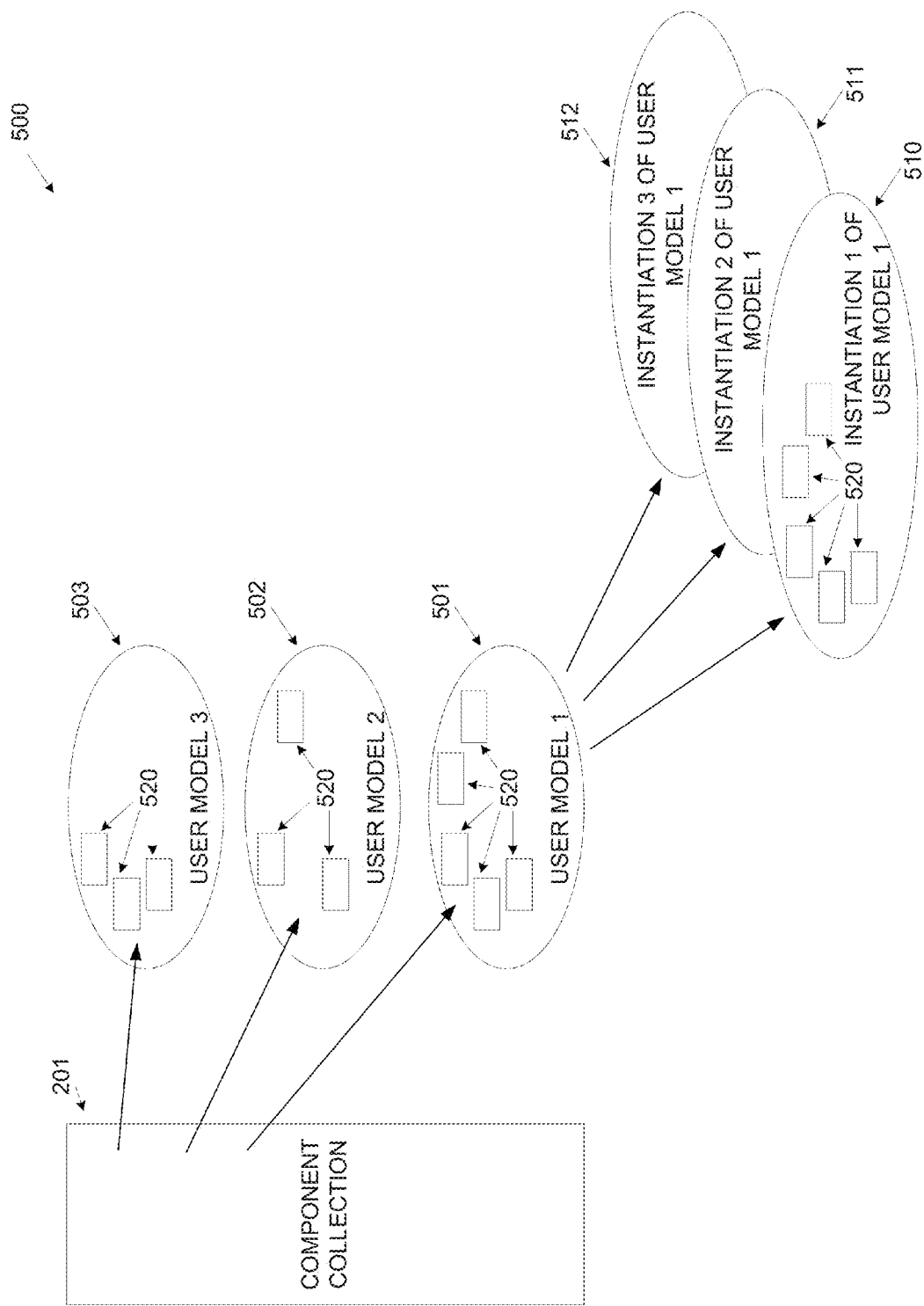
FIG. 5 is a schematic illustration of an exemplary design environment for developing and instantiating user models using component based approach, according to some embodiments of the present invention.

Reference is now made to FIG. 5 which is a schematic illustration of an exemplary design environment for developing and instantiating user models using component based approach, according to some embodiments of the present invention. An exemplary design environment 500 presents the sharing and reusability provided thought the component based approach. A plurality of software components 520 may be available in one or more component collections such as the component collection 201. The plurality of software components 520 may include software components 400 and/or software component compositions containing two or more components 400. The component collections 201 may be stored in a shared location, for example, computer, workstation, server, cluster of processing nodes and/or storage cloud such that the component collection(s) 201 are available to a plurality of user model developers. The plurality of users and/or user model developers may create a plurality of user models 501, 502 and/or 503 using the software components 520 as required to meet the requirements of the user models 501, 502, 503 and/or the applications the user models 501, 502 and 503 serve. Once the user models 501, 502 and 503 are created they may be executed and be instantiated to be used for information utilization, evaluation, explorations, optimization, analysis, adaptation and/or any other improvement for specific cases for one or more specific users. The instantiations 510, 511 and 512 are example instantiations of the user model 501 in which specific attribute data values are assigned to each of the instantiations 510, 511 and 512.

According to some embodiments of the present invention there are provided systems and methods for creating a group model using the component based approach. The group model includes one or more user models which are combined into a single model so as to model the characteristics, behavior and/or features of each of the user models within the group model. In addition it may optionally implement software components for group attribute (a group attribute is an attribute that is not relevant for a single user, such as being part of the same family).

Figure 6:
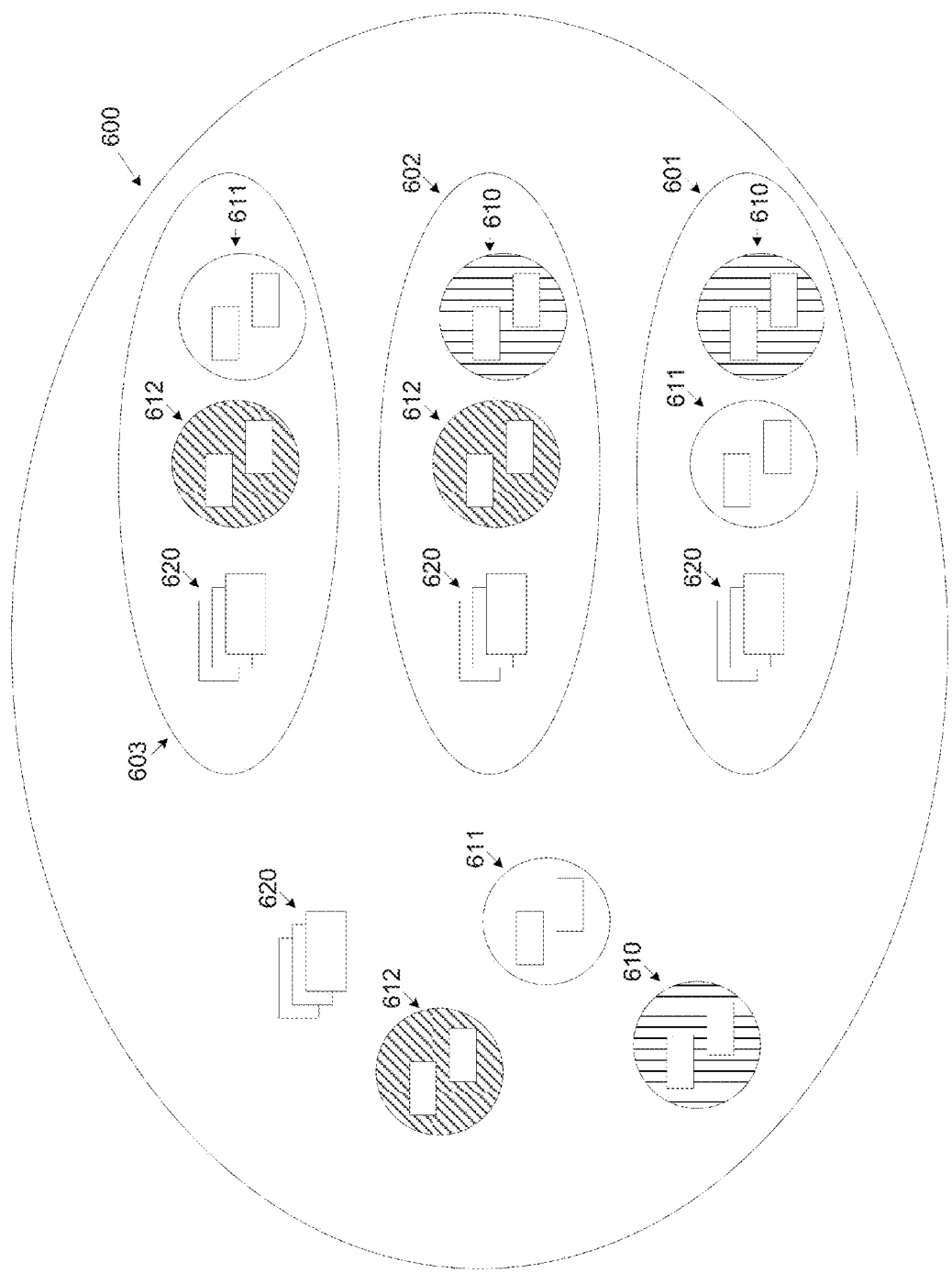
FIG. 6 which is a schematic illustration of an exemplary group model using component based approach, according to some embodiments of the present invention.

Reference is now made to FIG. 6 which is a schematic illustration of an exemplary group model using component based approach, according to some embodiments of the present invention. An exemplary group model 600 is a combination of group member user models, 610, 611 and 612 and a model of the entire group 600. Each of the user models, 610, 611 and 612 is constructed using the software components 400 and contains group attributes 620 relating to the concept expressed in each of them. Instantiation of the user models 610, 611 and/or 612 for a specific case and/or user as stand alone may be different compared to instantation of the same case and/or user in the company of other users and/or a higher level implementation. In the context of groups, the same user model may have different instantiation in different group models, for example, person may behave differently in the presence of his family compared to his behavior in the company of work colleagues. Attributes of the group members, for example, age, desires and/or personality may affect the behavior of the group members. In addition user models 610, 611 and/or 612 may behave differently when combined together in subgroups 601, 602 and/or 603 within the group model 600.

The attributes of the group model 600 may be represented through the following:
(1) The attributes 620 of the entire group model, for example, group types (family, friends and/or work), group interest (task and/or leisure activity) and/or group state (conflict, same location, separate locations and/or interaction).
(2) Description of the changes in a group member when the group member joins the group.
(3) Description of the group member user model 610, 611 and/or 612 in the company of only a members' subgroup models 601, 602 and/or 603 of that group model. An example may be two couples walking together as a group in a mall, and then separate into two subgroups; such as the first subgroup includes the two females and the second subgroup includes the two males.

The component based approach supports group modeling as it allows, for example, representation of the three aspects of the group model 600:
(1) Utilization of the attributes of each of the user models 610, 611 and 612 as standalone.
(2) Utilization of the group attributes 620 and the user models 610, 611 and 612 when joining the group model 600.
(3) Utilization of the group attributes 620 and the user models 610, 611 and 612 when participating in each of the subgroup models 601, 602 and/or 603. Each of the subgroup models 601, 602 and/or 603 may have additional software components 400 that hold attributes of the respective subgroup.
(4) Utilization of the attributes 620 of the entire group model 600. The group model may include only a subset of the software components 400 included in the group members user models 610, 611 and/or 612 and therefore the attributes 620 may relate to only the included subset of software components 400.

Using the component based approach for developing group models allows using software component 400 to represent group traits, subgroup models traits and individual user models traits.

Figure 7:
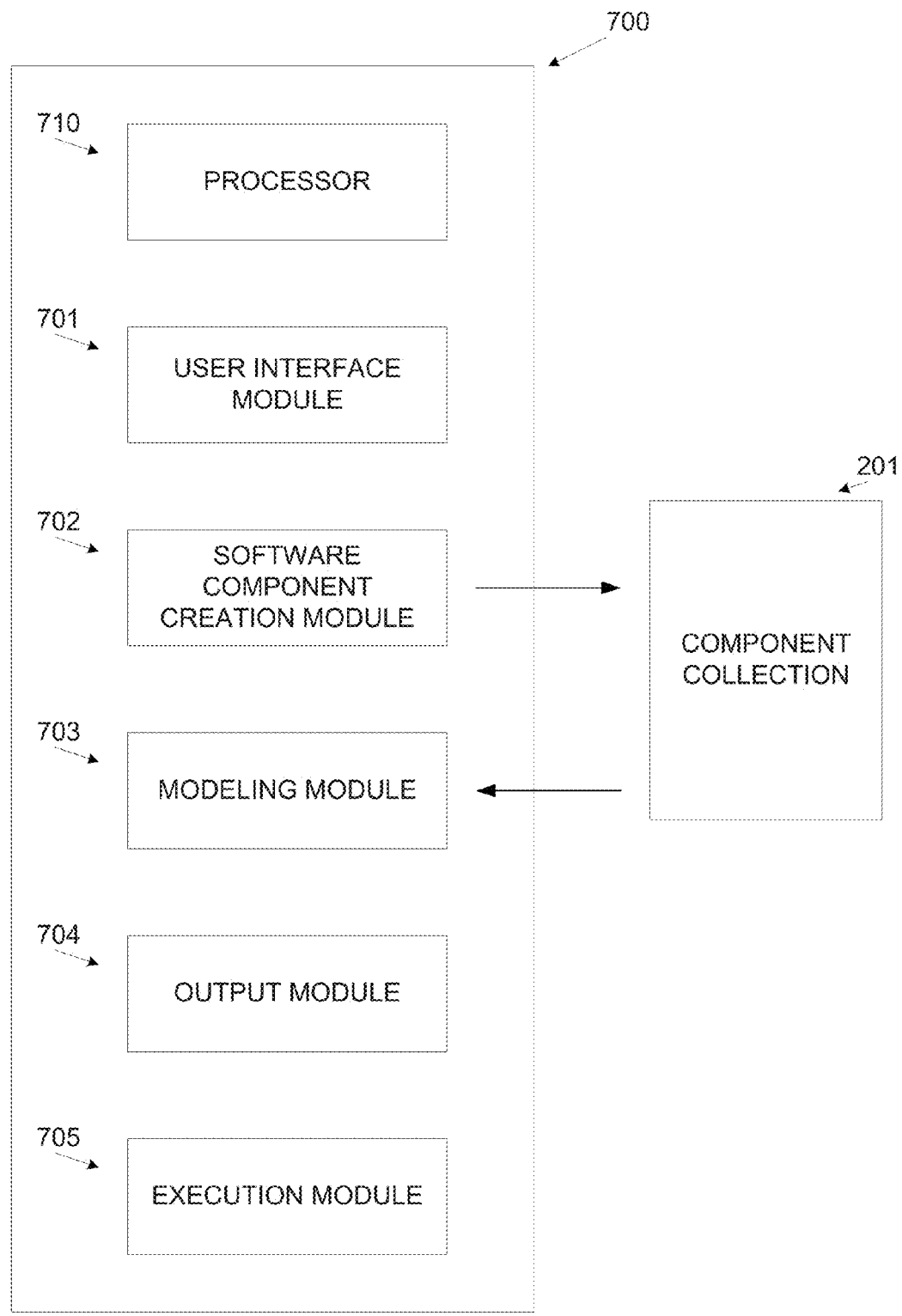
FIG. 7 is a schematic illustration of an exemplary system for creating a user model employing component based approach, according to some embodiment of the present invention.

Reference is now made to FIG. 7, which is a schematic illustration of an exemplary system for creating a user model employing component based approach, according to some embodiment of the present invention. A system 700 is a processing unit that includes a processor 710 capable of executing program instructions, for example, computer, server, workstation, cluster of processing nodes and/or cloud processing. The processor 710 executes several software modules, each responsible for a performing part of the overall modeling process such as the process 100. A user interface module 701 interacts with the user model developer for creating the user model using the software components 400 and/or software component compositions and linking. A software component creation module 702 is used to create the software components 400 according to the software component structure described hereinabove. The software component creation module 702 may interact with the user model developer through the user interface module 701. Interaction with the user model developer may be utilized through a plurality of human-machine interfaces, for example, keyboard, pointing device, touch screen and/or audio commands. The software component 400 that are created may be stored in a component collection such as the component collection 201. The component collection 201 may be implemented in a plurality of architectures, for example, local storage, remote storage, centralized storage, distributed storage, server and/or cloud storage. A modeling module 703 is performing as the engine for modeling the user model and/or the group model interactively with the user model developer using the user interface module 701. An output module 704 outputs the user model. The user model may be output to be presented to the user model developer and/or to be used in additional modeling, analysis, optimization, evaluation exploration, adaptation, improvement, and/or instantiation for information utilization.

The user model may be output in a plurality of representations, for example, visual representation and/or digital representation. Visual representation may be utilized through the user interface module 701 and may include, for example, display and/or printout. Digital representation may include, for example, binary file and/or data structure. The user model further includes an execution mechanism which may be used to instantiate the user model with the specific information of one or more users. Instantiation of the user model may be performed at any stage after the user model is created and outputted.

Optionally, the system 700 includes an execution module 705 which may instantiate the user model for specific one or more users. The execution module may also instantiate group models for a plurality of group member user models instantiated with a plurality of specific users.

According to some embodiments of the present invention, there is provided a computer program product for creating the software components 400, software component compositions and/or for creating a user model and/or group model using the software components 400 and/or the software component compositions. The computer program follows the process 100 and may be executed over the system 700.

Figure 8A:
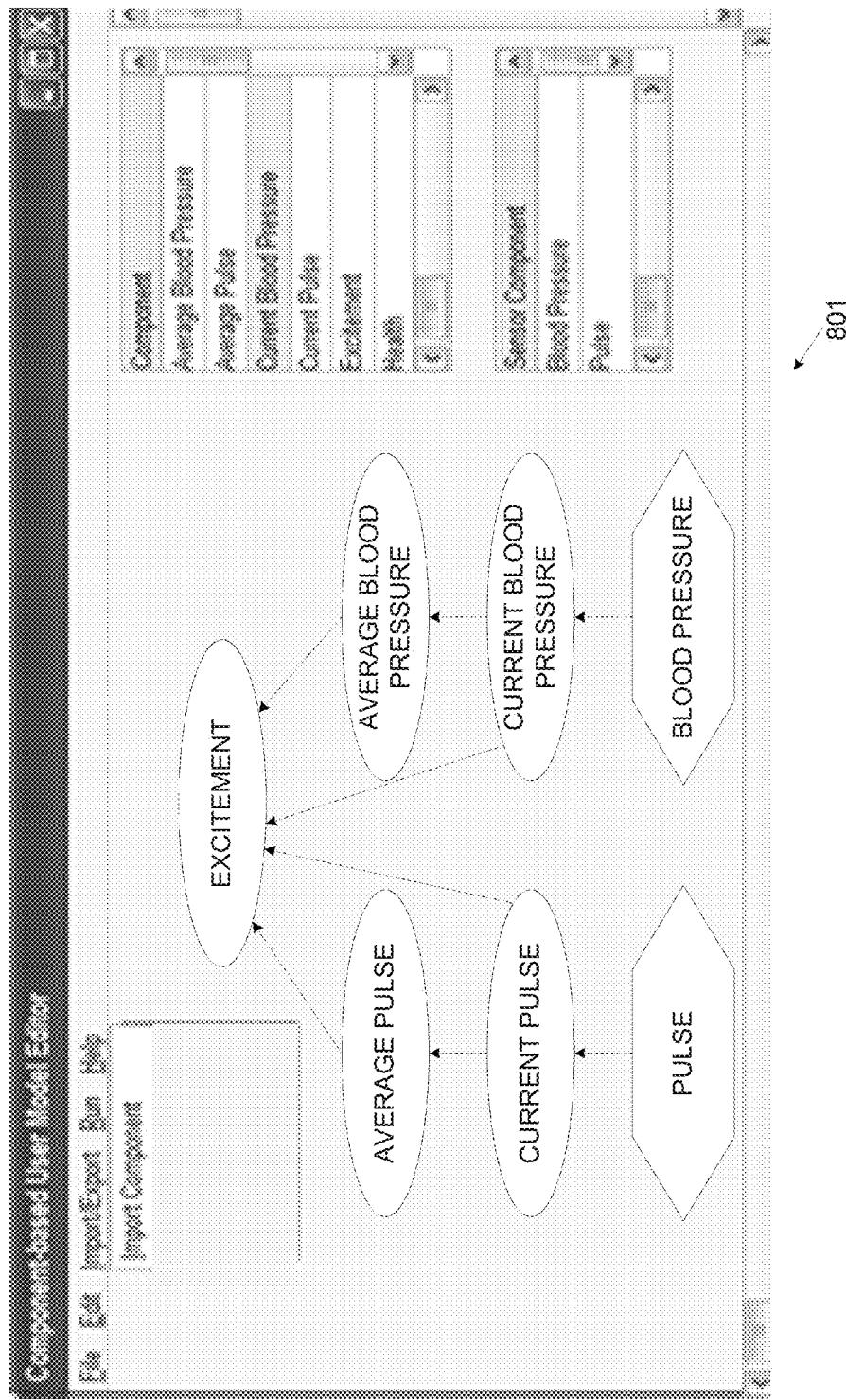
FIG. 8A is a screen capture of an exemplary software component selection screen of an exemplary user model editing tool, according to some embodiment of the present invention.

Reference is now made to FIG. 8A which is a screen capture of an exemplary software component selection screen of an exemplary user model editing tool, according to some embodiment of the present invention. As seen in the screen capture 801, once the software components are available in one or more component collections such as the component collection 201, located in a local storage medium and/or at remote storage, the user model developer may drag and drop the software components into the working area. As In the example presented in the screen capture 801, the user model developer may drag and drop a plurality of software components, blood pressure, pulse, current pulse, average pulse, current blood Pressure, average blood pressure and excitement to the working area. Each software component behaves differently when activated. The pulse software component provides an API (Application Programming Interface) to read a pulse sensor data of a user and it sends the pulse sensor data as reported by the sensor, for example, pulse readings, erroneous reports, measurement noise, missing data and/or outliers. The current pulse software component smoothes and validates the pulse sensor data and reports only valid data. The average pulse component uses the current pulse reported data as input, and calculates, for example, an annual average pulse. The software components related to blood pressure repeat the same process for blood pressure. The excitement component analyzes the user's level of excitement by comparing, for example, the current pulse to the average pulse, the current blood pressure with the average blood pressure and/or combining comparisons of the two. The user model editing tool automatically generates allowable dataflow links between the selected software components, represented by directed dashed arrows.

Figure 8B:
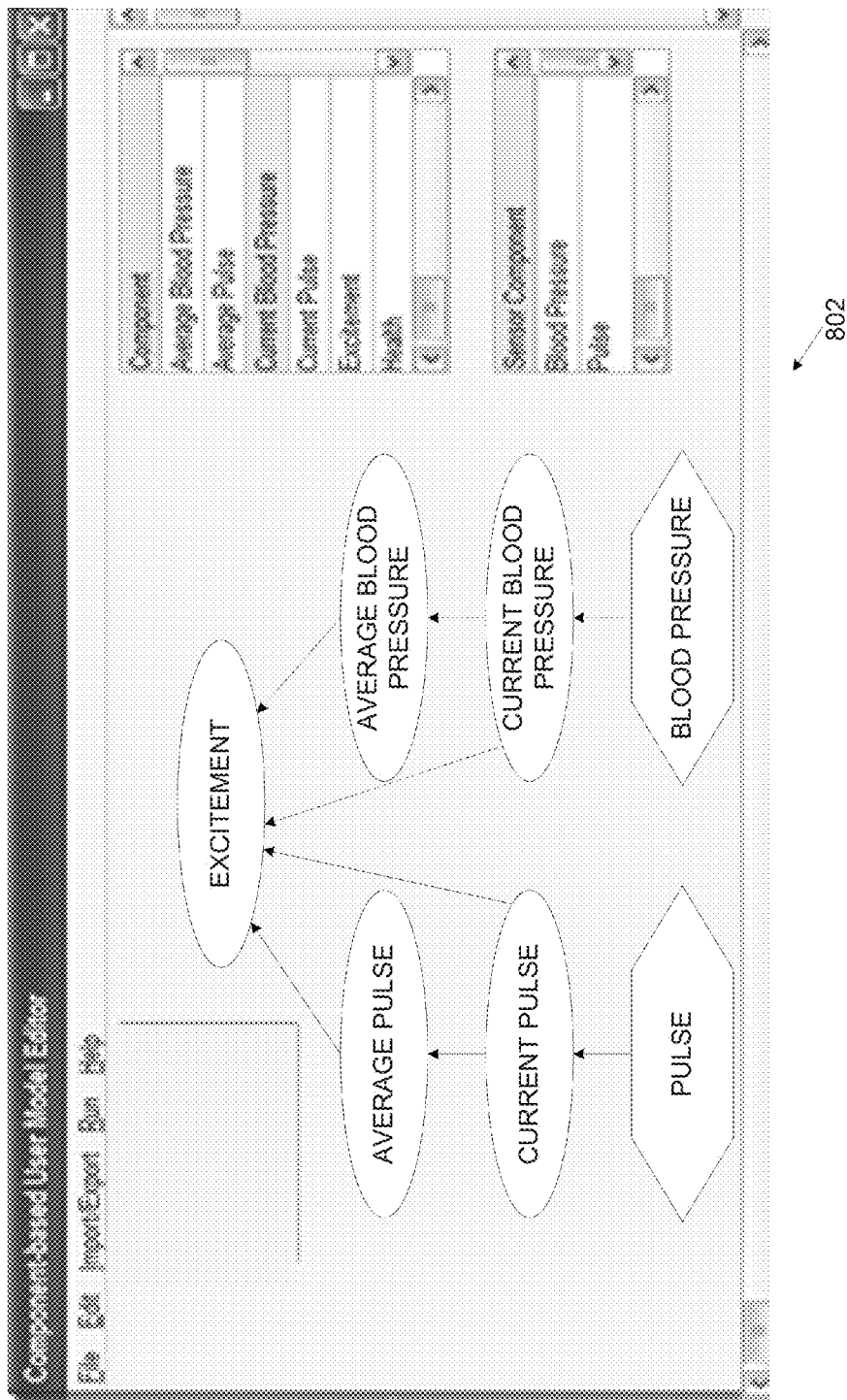
FIG. 8B is a screen capture of an exemplary data links editing screen of an exemplary user model editing tool, according to some embodiment of the present invention.

Reference is now made to FIG. 8B which is a screen capture of an exemplary data links editing screen of an exemplary user model editing tool, according to some embodiment of the present invention. As seen in the screen capture 802, once software components are selected, the user model automatically presents all valid links, and the user model developer approves the required data links. Upon instantiation of the user model to one or more specific users, data would flow only through the approved data links. Approved data links are shown as solid arrows. In the example presented in the screen capture 802, the developer of the user model uses only pulse data for analysis by the excitement software component. The data related to blood pressure is available by the blood pressure, current blood pressure and average blood pressure software components within the user model, however this data does not flow to the excitement software component as the appropriate data links are not approved (shown as dashed arrows). The user model developer may save the model through the user model editing tool menu. The saved user model may be instantiated for one or more specific users. The instantiated user model is a copy of the generic user model and may be stored in a storage medium, locally and/or remotely. The instantiated user model is capable of reporting pulse raw data, pulse smoothed data, blood pressure raw data, blood pressure smoothed data, average pulse, average blood pressure and/or excitement level.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the term commerce information and price is intended to include all such new technologies a priori.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computerized method of creating a user model, comprising:
   providing at least one software component collection of a plurality of software components, each one of said plurality of software components is associated with a single attribute and having:
      an input port adapted to receive at least one input attribute value, said at least one input attribute value is received from a member of a group consisting of: at least one of said plurality of software components or at least one hardware component; and
      an attribute generation engine for inferring a single attribute value from said at least one input attribute value,
      an attribute repository field which stores said single attribute value;
      an output port adapted to output said single attribute value to another of said plurality of software components, and
      a metadata which holds an identifier relating to respective said software component;
   selecting according to at least one developer input, a subset of said plurality of software components;
   defining according to said at least one developer input, a plurality of data links each defining a flow of a respective said single attribute value from a respective said output port of at least one member of said subset to a respective said input port of another member of said subset;
   generating a user model based on said subset and said plurality of data links;
   instantiating said user model for at least one specific user; and
   outputting said user model.

2. The method of claim 1, wherein said instantiation is done using an execution mechanism.

3. The method of claim 1, further comprising creating a group model which combines said user model with at least one another user model.

4. The method of claim 3, wherein said group model is instantiated for at least one specific group of users; and outputting said group model.

5. The method of claim 1, wherein said plurality of data links define a flow of a respective said single attribute value of each member of said subset within said user model.

6. The method of claim 1, wherein said user model further defines at least one data link between at least one service application external to said user model and a member of said subset in said user model.

7. The method of claim 1, wherein said plurality of data links include information relating to respective input and output ports of said plurality of software components within said user model.

8. The method of claim 1, further comprising using compositions of at least two of said plurality of software component to create said user model.

9. A system comprising:
   a non-transitory medium storing a plurality of software components, comprising:
      a medium which stores a plurality of software components, each one of said plurality of software components is associated with a single attribute and consists of:
         an input port which is set to receive at lea one input attribute value, said at least one input attribute value is received from a member of a group consisting of at least one other software component of said plurality of software components or at least one hardware component;
         attribute generation engine for inferring a single attribute value based on said at least one input attribute value;
         an attribute repository field which stores said single attribute value;
         an output port adapted to output said single attribute value in response to access by at least one another of said plurality of software components; and
         a metadata field which holds an identifier relating to respective said software component;
      a memory storing code instructions for receiving at least one developer input defining a plurality of data links each defining a flow from a respective said output port of at least one member of said subset to a respective said input port of another member of said subset;
      a processor adapted to execute said code instructions.

10. The system of claim 9, wherein each one of said plurality of software components further includes an attribute access object for managing said access.

11. The system of claim 9, wherein said attribute generation engine generates a default value for said single attribute value when said input data is not available.

12. The system of claim 9, wherein each one of said plurality of software components comprising said attribute repository field stores a plurality of possible attribute values for said single attribute value, each one of said plurality of attribute values is associated with a time tag.

13. The system of claim 9, wherein said metadata field holds additional information relating to said software component, said additional information includes at least one member of a group consisting of: software component type, user model identification data, group model identification data, instance identifier, interfaces description, configuration control, attribute definition and software component behavior explanations.

14. The system of claim 9, wherein said input object supports receiving input data from a plurality of different software components.

15. A system for creating a user model, comprising:
a processor;
a memory adapted to store a code executed by said processor, said code comprising;
code instructions for displaying a user interface which receives at least one developer input;
code instructions for creating a plurality of software components based on said at least one developer input, each of said plurality of software components comprises:
- an input port adapted to receive at least one input attribute value from at least one of said plurality of software components or at least one hardware component, and
- an attribute generation engine for inferring a single attribute value from said at least one input attribute value, and
- an attribute repository field which stores said single attribute value;
- an output port adapted to output a value of a single attribute to another of said plurality of software components;
wherein said plurality of software components are created using a template;
code instructions for defining according to said at least one developer input a plurality of data links each defining a flow from a respective said output port of at least one member of said subset to a respective said input port of another member of said subset;
code instructions for creating a user model based on selection of at least some of said plurality of software components by said at least one developer input through a user interface and according to said plurality of data links; and
an output module which outputs said user model in at least one of a plurality of representations.

16. The system of claim 15, wherein said code further comprises code instructions for instating said user model for at least one specific user using an execution mechanism.

17. The system of claim 16, wherein said code further comprises code instructions for instantiating a group model with at least two group member user models, each one of said at least two group member user models are instantiated for at least one instance of a user.

18. The system of claim 15, wherein at least one of said plurality of representations includes visual representation displayed to a developer.

19. The system of claim 15, wherein at least one of said plurality of representations includes a digital format for storing said user model in a storage medium or using said user model in at least one another system or software tool.

20. The system of claim 15, wherein said code further comprises code instructions for creating a group model which combines at least two said user models.

* * * * *